United States Patent
Fogal, Sr. et al.

[11] Patent Number: 5,386,857
[45] Date of Patent: Feb. 7, 1995

[54] METHOD OF AND APPARATUS FOR INTRODUCING PULVERULENT MATERIAL INTO A TIRE

[75] Inventors: Robert D. Fogal, Sr., Chambersburg, Pa.; Lester A. Beatty, Islington, Canada

[73] Assignee: International Marketing, Inc., Chambersburg, Pa.

[21] Appl. No.: 40,289

[22] Filed: Mar. 30, 1993

[51] Int. Cl.6 ............................................. B60C 19/00
[52] U.S. Cl. .................................... 141/5; 141/9; 141/38; 141/67; 141/100; 406/38; 406/146; 156/75; 152/154.1
[58] Field of Search ............ 141/1, 4, 5, 9, 38, 141/67, 100, 102, 105; 152/153, 154.1, 155, 157, 310-322, 415, 450, 502-504, 521; 156/75, 115; 301/5, 22; 406/38, 108, 122, 128-130, 137, 139, 146

[56] References Cited

U.S. PATENT DOCUMENTS

| | | | |
|---|---|---|---|
| 1,467,488 | 9/1923 | Muste | 406/128 X |
| 3,065,774 | 11/1962 | Grimes | 141/38 |
| 3,450,170 | 6/1969 | Andersen | 141/38 X |
| 3,515,181 | 6/1970 | Sperberg | 141/38 |
| 4,027,712 | 6/1977 | Verdier | 152/311 |
| 4,665,956 | 5/1987 | Freeman | 141/5 |
| 4,678,377 | 7/1987 | Bouchard | 406/139 |
| 4,917,544 | 4/1990 | Crahan et al. | 406/122 X |
| 5,073,217 | 12/1991 | Fogal | 156/75 |

FOREIGN PATENT DOCUMENTS 0874283  6/1971  Canada ............................... 406/146

*Primary Examiner*—J. Casimer Jacyna
*Attorney, Agent, or Firm*—Oldham, Oldham & Wilson Co.

[57] ABSTRACT

A method of and apparatus for introducing pulverulent material into a tire through a tire valve stem is performed by confining a predetermined amount of pulverulent material in a cylindrical chamber having axially spaced and radially offset inlets and outlets, subjecting the confined pulverulent material to pressurized air which is transformed into a cyclonic air current within the chamber by the radially offset inlet and outlet, and introducing admixed air/pulverulent material from the chamber into a tire through its associated tire valve stem.

23 Claims, 3 Drawing Sheets

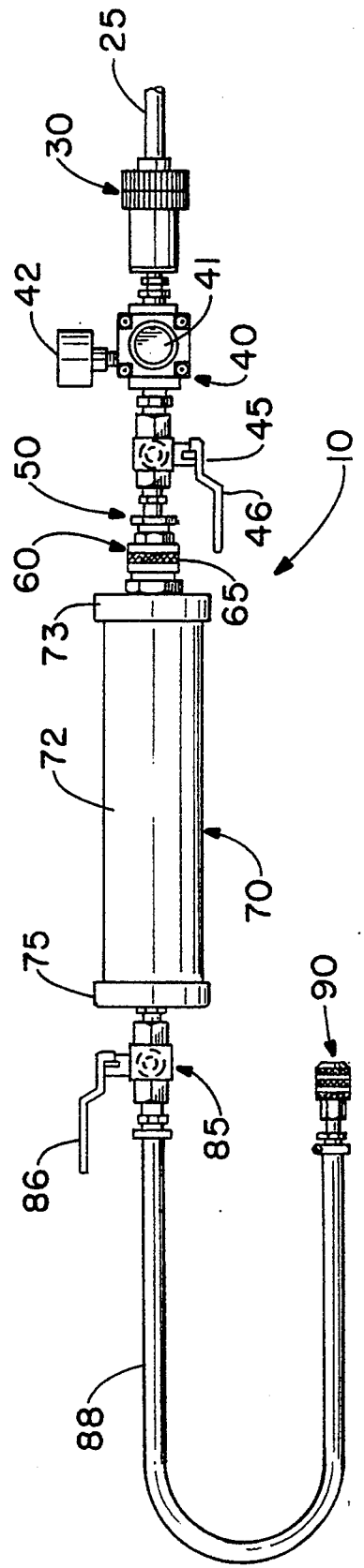
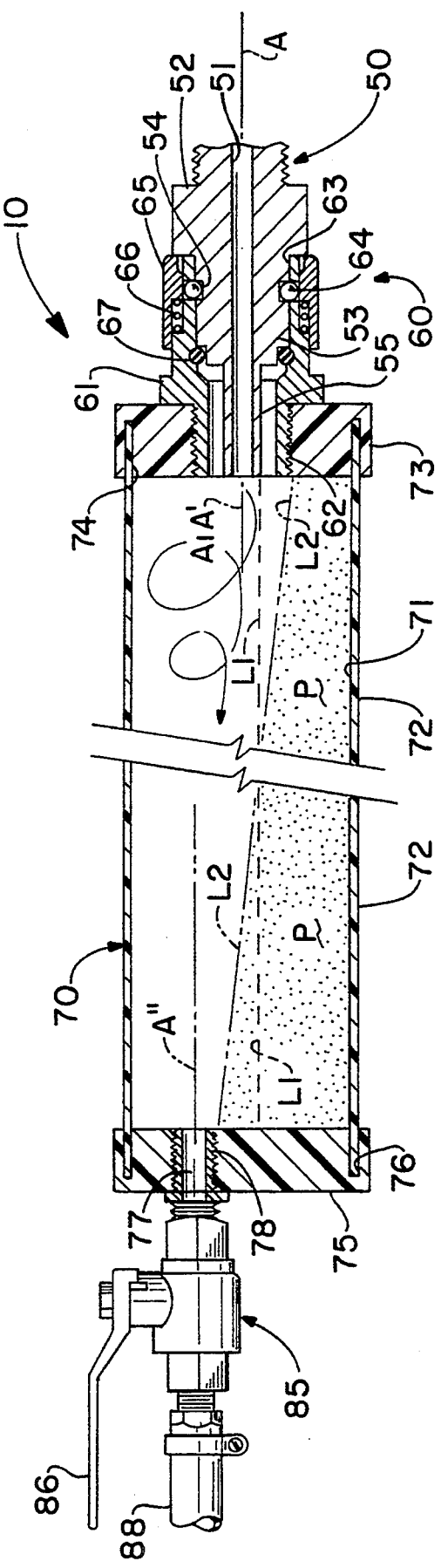
FIG.-2
FIG.-3

1

METHOD OF AND APPARATUS FOR INTRODUCING PULVERULENT MATERIAL INTO A TIRE

BACKGROUND OF THE INVENTION

The invention is directed to a novel method of and apparatus for introducing pulverulent material into tires, specifically radial tires of wheel assemblies of passenger and truck vehicles and aircraft. The method and apparatus are specifically directed to utilizing pulverulent polymeric/copolymeric synthetic plastic material and introducing the same into a tire through an associated tire valve to effect dynamic balancing of the associated wheel assembly and equalization of radial and lateral load force variations as the wheel assembly is subject to impact forces during rotation thereof along a surface, such as a road, airfield or the like.

The specifics of the method of balancing a wheel assembly and equalizing radial and lateral load force variations in accordance with the injection of pulverulent polymeric/copolymeric synthetic plastic material into a tire is fully disclosed in U.S. Pat. No. 5,073,217 in the name of Robert D. Fogal issued on Dec. 17, 1991. The specifics of the pulverulent material, as set forth in the latter patent and the screen size ranges, pulverulent material weight ranges and the weight ranges for a specific range of tires, as is also set forth in the latter-identified patent, are all incorporated hereat by reference.

SUMMARY Of THE INVENTION

In keeping with the present method, pulverulent material is introduced into a tire through a tire valve stem when the tire is inflated or partially deflated by
 (a) confining a predetermined amount of the pulverulent material in a volume,
 (b) subjecting the confined pulverulent material to pressurized cyclonic air currents, and
 (c) introducing the pulverulent material into a tire through an associated tire valve stem under the influence of the pressurized cyclonic air currents.

The method also includes filtering any moisture from the pulverulent material prior to the performance of confining step (a), specifically performing step (a) by establishing a generally cylindrically shaped volume of confinement, and creating the cyclonic air currents of step (c) by introducing and removing pressurized air into and out of the cylindrically shaped confinement volume at generally axially spaced and radially offset points.

The apparatus for accomplishing the method just described includes a source of pressurized air such as a compressor and inline filter, a pressure regulator, a generally cylindrical chamber having an inlet and an outlet and a hose assembly equipped with an on-off valve adjacent the outlet and a valve stem disconnect coupling for securing the hose assembly to a valve stem of an associated tire. The inlet and the outlet of the cylindrical chamber are axially remote and radially offset from each other to produce pressurized cyclonic air currents in the chamber under the influence of which pulverulent material therein is introduced into the tire through the tire valve stem upon the opening of the hose assembly valve.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 2 is an enlarged side elevational view of the apparatus of FIG. 1, and excludes the source of compressed air, the tire and a wheel/rim assembly.

FIG. 3 is an enlarged fragmentary axial cross-sectional view through a portion of the cylindrical chamber of FIGS. 1 and 2, and illustrates an axially spaced and radially offset inlet and outlet which create pressurized cyclonic air currents within the chamber for forcefully driving the pulverulent material through the outlet of the chamber and subsequently into the associated tire.

FIG. 1, is a fragmentary cross-sectional view of an inlet end of the chamber, and illustrates a funnel assembly having a quick disconnect fitting for charging the pulverulent material into the inlet opening of the cylindrical chamber.

DESCRIPTION OF THE PREFERRED EMBODIMENT

Figure 1:
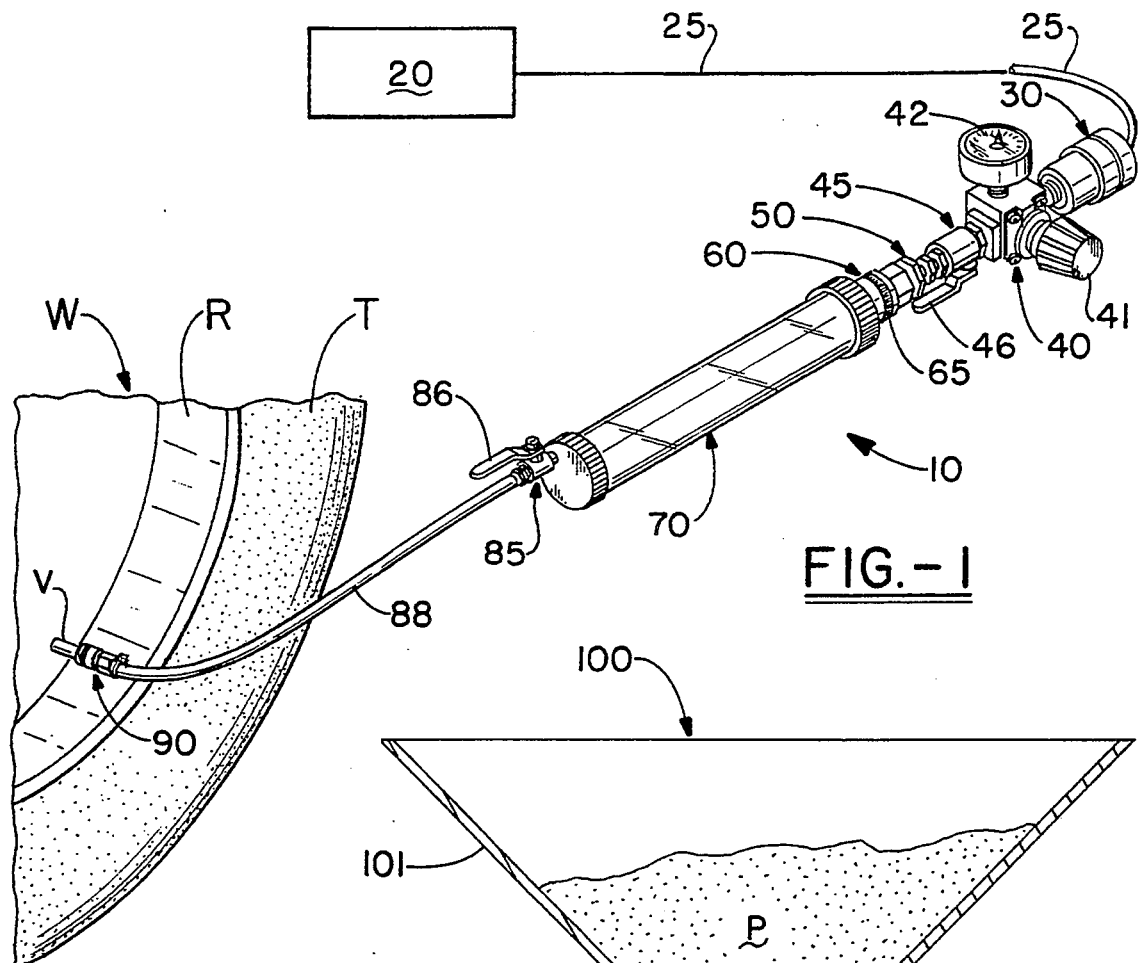
FIG. 1 is a fragmentary perspective view of an apparatus for introducing pulverulent material into a tire, and illustrates a source of air pressure, an in-line moisture filter, a pressure regulator, an on-off valve, a cylindrical chamber, another on-off valve, a flexible hose and a quick disconnect coupling secured to a valve stem of an associated tire.
Figure 1A:
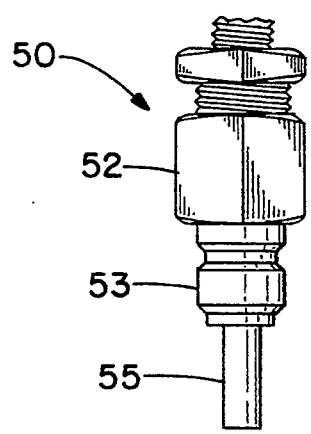

A novel apparatus for introducing pulverulent material, such as the pulverulent polymeric/copolymeric synthetic plastic material set forth in U.S. Pat. No. 5,073,217 is best illustrated in FIGS. 1 through 3 of the drawings, and is generally designated by the reference numeral 10.

The apparatus 10 is shown in FIG. 1 associated with a tire/wheel assembly W of an automobile, bus, truck, aircraft or the like which includes a tire T which is preferably a radial tire, a rim R, and a valve V conventionally secured to the rim R and being in conventional fluid communication with the tire T. The valve V includes a conventional valve core (not shown) which is preferably, though not necessarily, removed during the introduction of the pulverulent material into the tire T, as will be described more fully hereinafter.

The apparatus 10 includes means 20 for defining a source of pressurized air, such as a conventional air compressor, a conventional flexible line or hose 25, in-line filter means 30 for entrapping moisture and preventing moisture from flowing therebeyond, regulator means 40 for variably selectively adjustably regulating the air pressure, on-off valve means 45 for respectively permitting/preventing pressurized air flow, air inlet nipple assembly means 50 for introducing pressurized air into a means 70 for defining a cylindrical chamber and creating therein cyclonic pressurized air currents, quick disconnect coupling means 60 for connecting/disconnecting the air inlet nipple assembly means 50 to the chamber means 70, and another on-off valve means 80 for controlling the discharge of admixed pulverulent material/air into a flexible line or hose which includes a conventional valve stem quick disconnect coupling 90.

In FIGS. 1 through 3 the apparatus 10 is illustrated in its operative condition, namely, preparatory to delivering pulverulent material P from the chamber means 70 into the interior (unnumbered) of the tire T. However, prior thereto the chamber 70 must be charged/filled with the pulverulent material P, and the latter is accomplished through funnel assembly means 100 shown in FIG. 4 containing pulverulent material P which is illustrated being gravity fed in the direction of the unnumbered headed arrows associated therewith into an interior cylindrical chamber or volume 71 of the chamber means 70.

Figure 5:
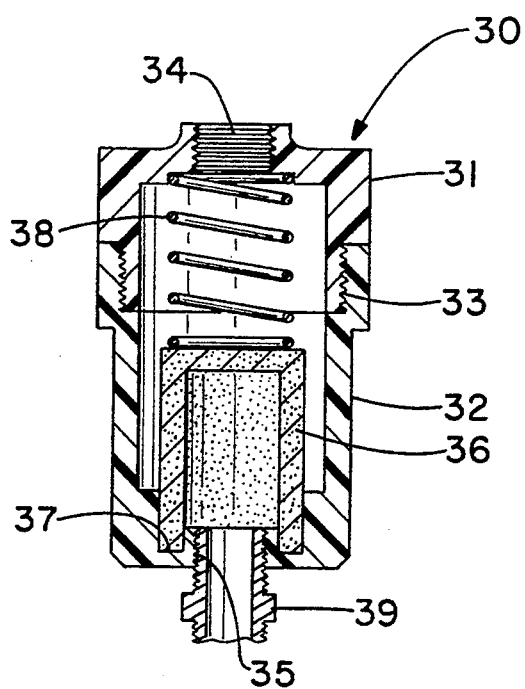
FIG. 5 is a fragmentary axial cross-sectional view through the in-line moisture filter of FIGS. 1 and 2, and illustrates the details of the construction thereof.
Figure 6:
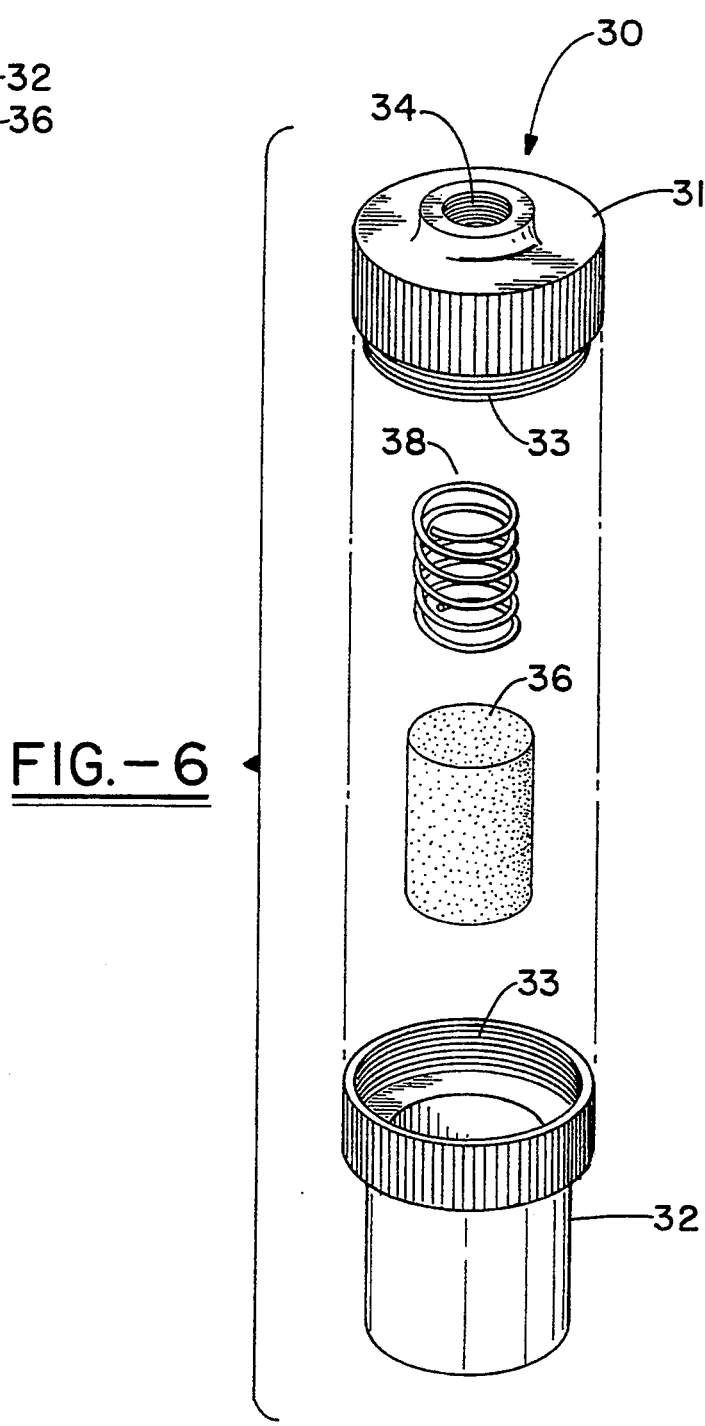
FIG. 6 is an enlarged exploded view of the in-line moisture filter of FIG. 5, and illustrates the manner in which a filter element/cartridge thereof can be removed and/or replaced.

The in-line filter means 30 for entrapping moisture or preventing moisture from flowing downstream toward and into the regulator means 40 and therebeyond is best illustrated in Figures 5 and 6 of the drawings and includes two generally cylindrical bodies 31, 32 which can be threaded and unthreaded by complementary threads 33. The cylindrical body 31 includes internal threads 34 to which a fitting (not shown) of the line or hose 25 is connected while the generally cylindrical body 32 likewise includes threads 35 to which a fitting 39, such as a hex nipple, is threaded. A generally cylindrical cup-shaped filter element/cartridge 36 has a lower terminal edge (unnumbered) seated in an upwardly opening annular groove 37. A compression spring 38 bottoms against an end (unnumbered) of the filter or filter element 36 and holds the terminal edge thereof within the groove 37 when the cylindrical bodies 31, 32 are fastened together by the complementary threads 33. The generally cylindrical bodies 31, 32 can be unthreaded to gain access to the filter 36, remove the filter, filter element or filter cartridge 36, and replace the same by a new cartridge, as in-use conditions dictate. The filter element 36 does not absorb moisture, it blocks moisture/condensate/water as the molecules of the filter element 36 expand as the filter element 36 becomes contaminated with moisture. As the molecules of the filter element 36 expand, they thus block the passage of air and if the filter element 36 becomes completely saturated, it will expand to the point of completely stopping all movement of air and/or moisture therethrough. Thus, the filter means 30 is a fail-safe check valve against moisture contamination from the compressed air source 20 via the line 25. When the filter element 36 becomes completely saturated, the cylindrical bodies 31, 32 are unthreaded by the complementary threads 33, a new filter element replaces the filter element 36, and operation can then continue.

The fitting 39 is threaded into an inlet (unnumbered) of the regulator means 40 (FIG. 2) which is preferably any one of several general purpose compressed air regulators manufactured by Norgren of 5400 South Delaware Street, Littleton, Colo. Compressed air regulators can be selected from various Norgren models for operating between pressure ranges of 250–400 psi (bar) and temperature ranges from 0° to 175° F., such as Models R05, R44, R46, R08, R12, R17, R22, R7 and 11-002. A handle 41 of the air regulator 40 is rotated appropriately to establish the outlet air pressure which is indicated upon a dial scale 42. The knob or handle 41 is pushed into lock a desired pressure setting and pulled out to unlock the pressure setting. In accordance with this invention the preferable maximum air pressure exiting the regulator 40 is 125 psi.

The on-off valve means 45 is suitably conventionally threaded to an outlet (not shown) of the regulator 41 and is in turn threaded conventionally to the air inlet nipple assembly means 50. The on-off valve means 45 is a conventional ball valve and includes a handle 46 which controls the flow of air through the valve means or valve 45.

The air inlet nipple assembly means 50 includes an air inlet, bore or passage 51 having an axis A (FIG. 2) which is coincident to an access A' of the chamber or chamber means 70 and the cylindrical volume 71 thereof. The air inlet or passage 51 is formed through a body 52 of the air inlet nozzle assembly means 50 including a major diameter portion 53 thereof which includes an outwardly opening locking groove and a minor diameter portion or reduced stem 55. The major diameter portion 53 defines the male portion of the quick disconnect coupling means 60 which is of a conventional construction and includes a tubular body 61 having an exterior threaded stem 62 and a female coupler 63 carrying locking balls 64 which are held locked in the groove 54 by an axial movable locking collar 65 normally biased to the locked position (FIG. 3) by a spring 66. In the locked condition an O-ring 67 provides a hermetic seal. When the collar 65 is moved downwardly, as viewed in FIG. 3, against the compression of the spring 66, the balls 64 are released from the groove 54 to allow the air inlet nipple assembly means 50 to be disconnected from the chamber means 70.

The chamber means 70 is preferably formed of three pieces of transparent polycarbonate (Lexan), namely, a cylindrical wall or housing 72 defining the cylindrical chamber or volume 71, an end cap 73 having an annular groove 74 and an end cap 75 having an annular groove 76. The groove 74, 76 received therein terminal edges (unnumbered) of the wall 72 and are preferably glued, ultrasonically bonded or otherwise permanently secured to each other. Outlet means or discharge means 77 of the chamber means 70 is defined by a fitting 78 threaded into a threaded bore (unnumbered) of the end cap 75. The outlet means or outlet 77 has an axis A" which is radially offset from the axis A, A', as is readily apparent in FIG. 3 of the drawings. Because of the radial offset between the axis A of the air inlet 51 and the axis A" of the outlet means or outlet 77, the pressurized air exiting the air inlet 51 creates cyclonic air currents within the chamber or volume 71 and thereby creates a uniform or homogeneous admixture of the pulverulent material P with the air which assures the discharge thereof through the outlet 77 without plugging the latter or plugging the valve stem V as might otherwise occur if the pulverulent material P agglomerates, a condition which would intend to occur if the axis A, A' and A" were coincident because the air exiting the air inlet 51 would be directed precisely toward the air outlet 77 and would tend to simply blow a mass of the pulverulent material P toward, into and in clogging relationship with the outlet 77. However, due to the radial offset of the axes A, A' relative to the axis A" such agglomeration/plugging is virtually precluded due to the cyclonic air/pulverulent material admixture current flow to, into and through the outlet 77.

The on-off valve means or valve 80 is also conventional and is threaded at one end to the fitting 78 and at an opposite end (unnumbered) to the flexible line or hose 85 with a handle 81 being utilized to open and/or close or regulate flow.

The valve stem quick disconnect means 90 is also conventional and serves to connect the hose 85 to the valve stem V when the valve core has preferably been removed therefrom.

Figure 4:
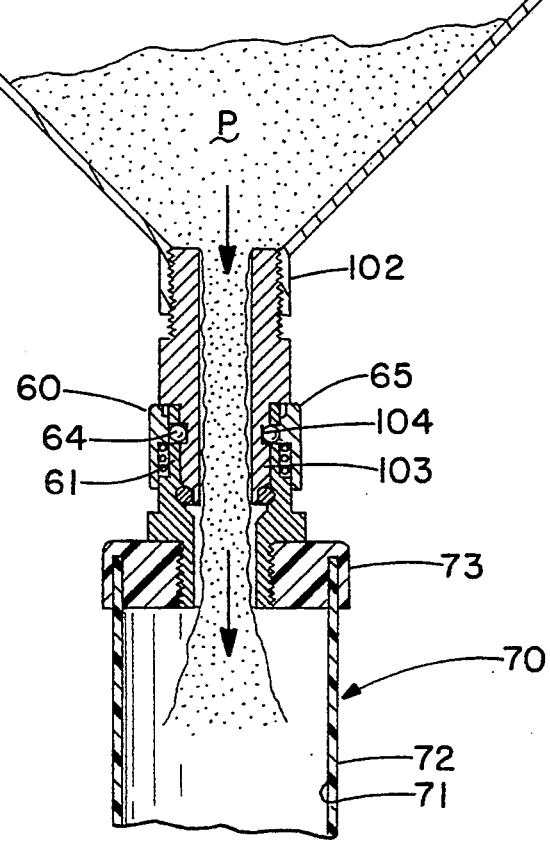
FIG. 4, which appears on the sheet of drawing containing

Reference is made to FIG. 4 which illustrates the air inlet nipple assembly means 50 removed from the quick disconnect coupling means 60 and secured to the latter is the funnel assembly means 100 which includes a metallic funnel 101 which includes an internally threaded cylindrical portion 102 threaded upon an exterior threaded portion of a male coupler 103 having an outwardly opening peripheral groove 104. Before the tire T is charged with the pulverulent material P, the pulverulent material P must be first charged into the chamber means 70, and this is done simply by gravity, as shown in FIG. 4. Obviously, if the air inlet nipple assembly means 50 is connected to the quick disconnect coupling means 60, the latter are disconnected, as shown in FIG. 4, the male coupler 103 is inserted into the tubular body 61 of the quick disconnect coupling means 60, the pulverulent material P is poured into the funnel 101, and eventually the chamber means 70 is filled with an appropriate amount of the pulverulent material P. Thereafter, the collar 65 is moved downwardly, as viewed in FIG. 4, releasing the funnel assembly means 100 which is removed and followed by the recoupling of the air inlet nipple assembly 50 to the quick disconnect coupling means 60.

The amount of pulverulent material P which is introduced into the chamber or volume 71 of the chamber means 70 depends upon the particular size of the tire which is to be charged, and may, for example, range from 3 ounces to 24 ounces. For example, for a tire size 215/85 (R16), three ounces of the pulverulent material P is sufficient per tire. A tire size of 205/60 (R17.3) requires 4 ounces of pulverulent material P per tire, whereas a 235/80 (R22.5) tire size requires 6 ounces of the pulverulent material P. At the larger spectrum of tire sizes, an 18 (R22.5) tire size requires 24 ounces of the pulverulent material P. Thus, the overall size of the chamber means 70 must be sufficient to adequately contain anywhere from 3 ounces to 24 ounces of the pulverulent material P, and it has been found that a chamber 70 of approximately 16 inches end-to-end of a 3 inch internal diameter will accommodate up to and beyond the maximum 24 ounces of pulverulent material and create and maintain the desired cyclonic pressurized air currents heretofore noted.

Once the pulverulent material P has been introduced into the volume 71, both valve E or valves 45, 80 are closed. The valve core (not shown) of the valve stem V is removed and the air pressure of the tire T is bled down to approximately 40 psi for most large tires, particularly truck, bus and larger aircraft tires. The hose 85 is then connected via the valve stem quick disconnect coupling 90 to the valve stem V, and the air pressure regulator 40 is set by appropriately rotating the handle or knob 41 to adjust the air pressure so as not to exceed recommended tire inflation pressure and at no time exceed 125 psi. The air compressor 20 is energized, if not earlier energized, but at no time is the air compressor 20 energized while the valve 45 is open.

The chamber means 70 is then held horizontal and shaken to make certain that the pulverulent material P is clear from both the air inlet 51 and the outlet 77. As might be appreciated from FIG. 4, the pulverulent material P falling into the chamber means 70 will enter the outlet 77 during the filling operation, and though the pulverulent material P is extremely dry, freely flowable and powdery, an effort should be made to remove the same from any one or both of the air inlet 51 and the outlet 77 to prevent plugging/agglomeration in and anywhere downstream from the outlet 77. By holding the chamber means 70 horizontally and shaking the same, preferably horizontally, both the air inlet 51 and the outlet 77 are freed of the pulverulent material P. In FIG. 3, there are two lines L1, L2 which designate two different levels/attitudes of the pulverulent material P in the chamber means 70 after the completion of the horizontal shaking operation just described. The level L1 of the pulverulent material P is essentially parallel to the horizontal when the chamber means 70 is essentially horizontal. The level L2 is a variation of the level of the pulverulent material when the chamber 70 is perhaps not held perfectly level to the horizontal or is not shaken to essentially level the pulverulent material P with its surface generally horizontal. However, at both levels L1, L2 of the pulverulent material P and any other levels, it is important to note that both the inlet 51 and the outlet 77 are free of the pulverulent material P, but more importantly both the inlet 51 and the outlet 77 are above the levels L1, L2 or any other levels of the pulverulent material P.

While the chamber means 70 is held in the horizontal position shown in FIG. 3 with any one of the levels L1, L2 ... Ln being clearly visible in the volume 71 through the transparent wall 72, the operator opens the valve 80 by appropriately moving the handle 81. Thereafter, the handle 46 is moved to open the valve 45, and as the air exits the air inlet 51, it impinges upon and admixes with the pulverulent material P which can be visually seen through the transparent wall 72. This admixture is extremely homogeneous and the latter is achieved through a swirling or cyclonic air current effect created by the radial offset of the inlet and outlet axes A, A", respectively Thus, as pressurized cyclonic air currents are created in the chamber 71, as indicated by the unnumbered arrows therein, the admixed pulverulent material and pressurized air, hereinafter termed pressurized admixture, will be delivered through the hose 85, the quick disconnect coupling 90 and the valve stem V in the interior of the tire T. The operator slowly and methodically lowers the left end of the chamber means 70, as viewed in FIG. 3, away from the horizontal (or alternatively lifts the right end thereof) which progressively feeds more and more of the pulverulent material P toward the air stream entering through the inlet 51 creating the pressurized admixture and delivering the pressurized admixture progressively into and through the outlet 77. Thus by tilting the chamber means 70 from the horizontal position shown in FIG. 3 slowly counterclockwise, so to speak, in this same figure, the pulverulent material P will be slowly and uniformly introduced from its upper surface levels L1, L2 ... Ln into the air stream exiting the air inlet 51, and this coupled with the cyclonic/swirling air current heretofore noted assures that the pressurized admixture is homogenous/uniform and, therefore, will neither agglomerate in or plug the outlet 77 or the air flow path downstream therefrom resulting in the discharging of the precise amount of pulverulent material P required into the tire T. After the totality of the pressurized admixture, including all of the pulverulent material P, has been discharged from the chamber means 70 into the tire T, the handle 46 of the on-off valve means 45 is moved to its closed position and with or without moving the handle 81 of the valve 80 to its closed position the disconnect coupling 80 is disconnected from the valve stem V. The valve core (not shown) is quickly replaced into the valve stem V, and the tire is re-aired to its recommended pressure with the valve stem V being recapped by a self-sealing tire valve stem cap.

If during the charging operation just described, the pulverulent material plugs at the valve stem V, the valve 45 is closed and the valve 80 remains open and the air pressure in the tire T forces or blows any "plugged" pulverulent material from the valve stem V. Obviously, both valves 45, 80 should be closed at any time if the operator senses too high of a pressure rise in the tire T. In addition, before the air inlet nipple assembly means 50 is removed to refill/recharge the chamber means 70, as shown in FIG. 4, the air compressor 20 must be turned off and both valves 45, 80 must be opened to relieve any internal pressure in the overall apparatus 10. Generally, the charging operation just described can be completed by an operator in less than 60 seconds.

Although a preferred embodiment of the invention has been specifically illustrated and described herein, it is to be understood that minor variations may be made in the apparatus without departing from the spirit and scope of the invention, as defined the appended claims.

We claim:

1. A method of introducing a pulverulent material into a tire through a tire valve stem comprising the steps of
   (a) confining a predetermined amount of pulverulent material,
   (b) subjecting the confined pulverulent material to pressurized cyclonic air currents moving along a generally horizontal flow path,
   (c) progressively altering the generally horizontal flow path to an inclined flow path, and
   (d) introducing the pulverulent material into a tire through an associated tire valve stem under the influence of the pressurized cyclonic air currents.

2. The method as defined in claim 1 wherein said inclined flow path descends in the direction of flow.

3. A method of introducing a pulverulent material into a tire through a tire valve stem comprising the steps of
   (a) confining a predetermined amount of pulverulent material in an essentially rigid chamber having a single air inlet and an air outlet which are radially and axially offset,
   (b) subjecting the confined pulverulent material to pressurized cyclonic air currents moving along a generally inclined flow path descending in the direction of flow, and
   (c) introducing the pulverulent material into a tire through an associated tire valve stem under the influence of the pressurized cyclonic air currents, the amount of pulverulent material so introduced being sufficient to effect dynamic balancing of said tire and an associated wheel assembly.

4. A method of introducing a pulverulent solid material into a tire through a tire valve stem comprising the steps of:
   (a) confining a predetermined amount of pulverulent material in an essentially rigid chamber having a single air inlet and an air outlet which are radially and axially offset and at opposite ends of said chamber,
   (b) passing a pressurized air stream successively through said air inlet passageway, said chamber and said air outlet passageway, the pressurized air creating cyclonic air currents within the chamber and thereby creating an essentially uniform admixture of said pulverulent material and air, and
   (c) introducing the resulting admixture of said pulverulent material and air into a tire through an associated tire valve stem under the influence of the pressurized cyclonic air currents, the amount of pulverulent material so introduced into the tire being sufficient to effect dynamic balancing of said tire and a wheel assembly associated therewith but insufficient to substantially fill said tire.

5. The method as defined in claim 4 including the step of
   (d) selectively adjustably regulating the pressurization of the air currents.

6. The method as defined in claim 4 including the steps of
   (d) establishing a flow path for pressurized air having upstream and downstream flow path portions with step (a) being performed therebetween, and
   (e) selectively valving the flow of pressurized air in the upstream and downstream flow path portions.

7. The method as defined in claim 4 wherein
   (d) step (a) is performed by establishing a generally cylindrically shaped volume of confinement,
   (e) introducing and removing pressurized air respectively into and out of the cylindrically shaped confinement volume at generally axially remote points of the cylindrically shaped confinement volume, and
   (f) creating the cyclonic air currents of step (b) by radially offsetting the axially remote points.

8. The method defined in claim 4 wherein the amount of pulverulent material introduced into the tire is from about 3 ounces to about 24 ounces.

9. The method defined in claim 4, wherein said pulverulent material is dry and freely flowable.

10. The method defined in claim 4 wherein substantially all air introduced into said tire in said admixture of air and pulverulent material is retained in said tire during introduction of said admixture.

11. The method defined in claim 4 wherein the pressurized air stream passed through said chamber is the only air stream introduced into said tire.

12. The method defined in claim 4, wherein said pressurized air stream is filtered to remove moisture prior to passing through said chamber.

13. The method defined in claim 4 wherein said chamber is essentially rigid.

14. The method defined in claim 12 wherein said chamber is essentially cylindrical.

15. The method defined in claim 4 wherein said pressurized air stream is pressurized to a pressure sufficient to inflate a tire but not over about 125 pounds per square inch.

16. The method defined in claim 15 wherein said pressurized air stream is pressurized to a pressure from about 40 to about 125 pounds per square inch.

17. An apparatus for introducing a pulverulent material into a tire through a tire valve stem comprising:
   (a) an essentially rigid and essentially cylindrical chamber for confining a predetermined amount of pulverulent material, said cylindrical chamber having a single air inlet and a single air outlet which are radially and axially offset and at opposite first and second ends of said chamber, said air inlet and said air outlet being axially remote and non-aligned whereby the confined pulverulent material is subjected to pressurized cyclonic air currents when pressurized air is introduced through said air inlet, (b) a source of pressurized air, (c) a flow path for pressurized air extending from said source of pressurized air to said air inlet, said flow path having a pressure regulator therein, and (d) means for introducing an admixture of pressurized air and said pulverulent material into a tire through an associated tire valve stem under the influence of the pressurized cyclonic air currents, the volume of said chamber being sufficient to contain an amount of pulverulent material sufficient to effect dynamic balancing of said tire and an associated wheel assembly but insufficient to fill said tire.

18. The apparatus as defined in claim 17 including (d) means for selectively adjustably regulating the pressurization of the air currents.

19. The apparatus as defined in claim 17 including (d) means for establishing a flow path for pressurized air having upstream and downstream flow path portions with said confining means being located therebetween, and (e) means for selectively valving the flow of pressurized air in the upstream and downstream flow path portions.

20. The apparatus defined in claim 17 wherein the volume of said chamber is such as to contain from about 3 ounces to about 24 ounces of said pulverulent material.

21. The apparatus defined in claim 17, said apparatus providing a single air stream extending from said source of pressurized air to said tire valve stem.

22. The apparatus defined in claim 17, said apparatus further including a filter for removing moisture upstream of said chamber.

23. The apparatus defined in claim 17, further including (e) a flexible hose for delivering a mixture of air and pulverulent material from said cylindrical chamber to a tire; and (f) a manually operated on/off valve for controlling the discharge of said mixture of air and pulverulent material into said flexible hose.

* * * * *